(12) United States Patent
Goyal et al.

(10) Patent No.: US 10,671,589 B2
(45) Date of Patent: Jun. 2, 2020

(54) SYNERGIZING REAL-TIME AND POLLING CONNECTORS FOR DATA INGESTION

(71) Applicant: salesforce.com, inc., San Francisco, CA (US)

(72) Inventors: Ankush Goyal, San Mateo, CA (US); Shardul Vikram, San Francisco, CA (US); Nathaniel Richard Price, Menlo Park, CA (US); Sudarshan Vijay Sarolkar, Milpitas, CA (US); Scott Walter Bishel, Erie, CA (US); Praveen Innamuri, Santa Clara, CA (US); Jon Tomas Gretarsson, Redwood City, CA (US)

(73) Assignee: salesforce.com, inc., San Francisco, CA (US)

( * ) Notice: Subject to any disclaimer, the term of this patent is extended or adjusted under 35 U.S.C. 154(b) by 179 days.

(21) Appl. No.: 15/449,500

(22) Filed: Mar. 3, 2017

(65) Prior Publication Data
US 2018/0253458 A1   Sep. 6, 2018

(51) Int. Cl.
| G06F 17/30 | (2006.01) |
| G06F 16/23 | (2019.01) |
| H04L 29/08 | (2006.01) |
| H04L 12/26 | (2006.01) |
| G06F 16/245 | (2019.01) |

(52) U.S. Cl.
CPC ............ *G06F 16/23* (2019.01); *G06F 16/245* (2019.01); *H04L 43/103* (2013.01); *H04L 67/1097* (2013.01)

(58) Field of Classification Search
CPC ......... G06F 17/30345; G06F 17/30424; H04L 67/1097; H04L 43/103
See application file for complete search history.

(56) References Cited

U.S. PATENT DOCUMENTS

| 2010/0125624 | A1* | 5/2010 | Bachhuber-Haller .... G06F 9/52 709/202 |
| 2012/0296876 | A1* | 11/2012 | Bacinschi ............... H04L 63/12 707/687 |
| 2013/0110890 | A1* | 5/2013 | Bailor ..................... H04L 51/22 707/827 |
| 2013/0212200 | A1* | 8/2013 | Dennis .................... H04L 51/22 709/206 |
| 2014/0032741 | A1* | 1/2014 | Lau ...................... H04L 67/1095 709/224 |
| 2014/0274086 | A1* | 9/2014 | Boerjesson ......... H04L 65/1006 455/450 |
| 2015/0074170 | A1* | 3/2015 | Steiner ................... G06Q 10/06 709/202 |

(Continued)

*Primary Examiner* — Jeff A Burke
*Assistant Examiner* — Fernando M. Mari
(74) *Attorney, Agent, or Firm* — Holland & Hart LLP

(57) ABSTRACT

A system may utilize a combination of real-time and polling connectors for data crawling. A real-time connector may use a collector to write data associated with a new event from a database to a channel and record external identifiers (IDs) associated the data. A polling connector may use a verifier to compare the recorded IDs with IDs associated with a batch of data, and may write any data of the batch of data to the channel that has not been written previously written by the collector. The system may include an onboarder for reading data previously stored in the database.

13 Claims, 9 Drawing Sheets

(56) References Cited

U.S. PATENT DOCUMENTS

| | | | |
|---|---|---|---|
| 2015/0381452 A1* | 12/2015 | Deen | H04L 67/10 |
| | | | 709/224 |
| 2016/0048778 A1* | 2/2016 | Sharon | G06Q 10/063 |
| | | | 705/7.11 |
| 2016/0212078 A1* | 7/2016 | Smith | H04L 51/10 |
| 2016/0277542 A1* | 9/2016 | Bhatia | H04L 69/14 |

* cited by examiner

SYNERGIZING REAL-TIME AND POLLING CONNECTORS FOR DATA INGESTION

FIELD OF TECHNOLOGY

The present disclosure relates generally to database systems and data processing, and more specifically to synergizing real-time and polling connectors for data ingestion.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A data processing system may poll a datasource to retrieve new data from the datasource. In some cases, the system is configured to poll the datasource periodically to retrieve new data from the datasource in batches. In other cases, the system is configured to retrieve new data as it is generated at the datasource. Systems that periodically poll the datasource and retrieve data in batches may result in retrieval latencies that are unacceptable for certain applications. Systems that retrieve data as it is generated at the datasource may be unreliable, which may result in a failure to retrieve some data from the datasource.

DETAILED DESCRIPTION

Figure 1:
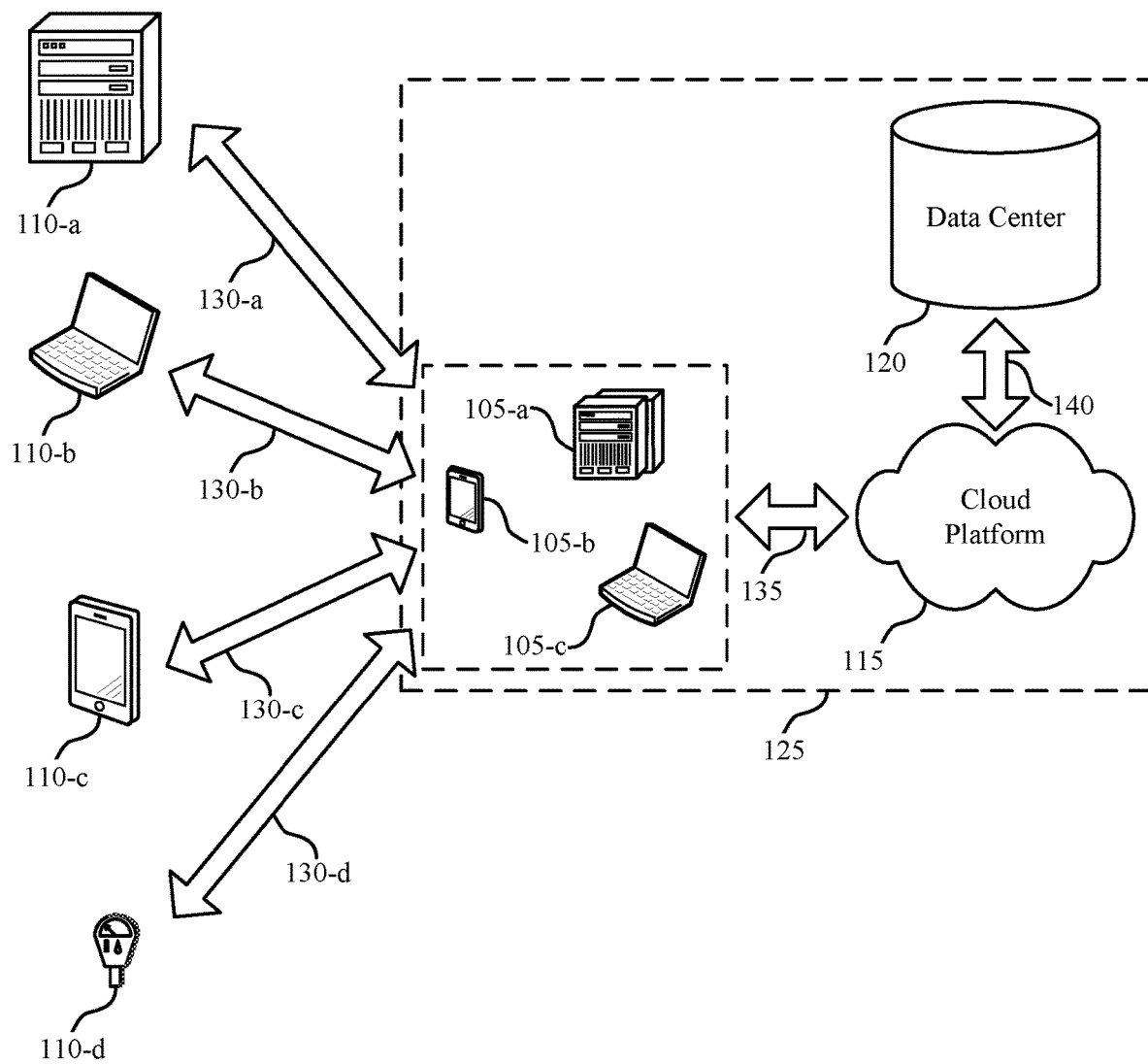
FIGS. 1 and 2 illustrate examples of environments for data processing that support synergizing real-time and polling connectors for data ingestion in accordance with aspects of the present disclosure.

A data processing system may be configured to retrieve data from a datasource and process the data for use in other applications. For example, a system may retrieve email messages from an email server, normalize the data, and write the data to a channel for use in a downstream process. To retrieve data from a datasource, the system may use a crawler, which may also be referred to as a connector. In some cases, a connector may be configured to retrieve new data from the datasource periodically in batches (e.g., a polling connector). However, the latency (e.g., five minutes) caused by periodically receiving data in batches may be unacceptable for certain applications. Moreover, a datasource may limit the number of requests for new data (e.g., calls) over a period of time. In such cases, a polling connector may inefficiently exhaust the allocated number of requests, since the polling connector is configured to send requests periodically regardless of if new data is expected to be at the datasource (e.g., in the middle of the night). In some cases, a connector may be configured to retrieve data as it is being generated at the datasource (e.g., a real-time connector). Although real-time connectors may reduce latency, they may introduce unreliability into the system, potentially resulting in missing new data from the datasource.

In accordance with aspects of the disclosure, a system may utilize a combination of real-time connectors and polling connectors for retrieving data from a datasource. The system may use a real-time connector to retrieve data from the datasource as the data is being generated. The real-time connector may also record external identifiers (IDs) associated with the data (e.g., emails) it retrieves. The system may also use a polling connector configured to periodically request the IDs of data generated at the datasource from a given time period (e.g., since the last watermark). Requesting and reading the IDs of the data may consume less resources (e.g., time and bandwidth) than if the actual data was requested and read periodically.

The system may then compare the IDs retrieved from the polling connector to the IDs retrieved from the real-time connector for a given time period to determine if all the data generated over that time period was actually retrieved by the real-time connector. If the system determines, based on comparing the IDs recorded by the two connectors, that the real-time connector missed some data, the polling connector may request the data from the datasource corresponding to the missed data.

The system may therefore be configured to utilize a combination of connectors to retrieve data in real time (or at least reduce retrieval latency) while increasing reliability by periodically verifying that all the newly generated data was actually retrieved. Also, by initially requesting the IDs associated with data, and then requesting only the data associated with IDs that were not retrieved by the real-time connector, the polling connector may be configured to efficiently utilize bandwidth and the number of allocated calls to a datasource. Such a system may also provide diagnostic information regarding the performance of the system because the verification process will inform what data is being missed by the real-time connector, how often, etc.

Aspects of the disclosure are initially described in the context of environments or systems supporting data processing. Examples of a real-time connector and a polling connector are then described that support synergizing the two connectors for reliable and efficient data ingestion. Aspects of the disclosure are further illustrated by and described with reference to apparatus diagrams, system diagrams, and flowcharts that relate to synergizing real-time and polling connectors for data ingestion.

FIG. 1 illustrates an example of an environment 100 for cloud computing that supports synergizing real-time and polling connectors for data ingestion in accordance with various aspects of the present disclosure. The environment 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). A contact 110 may be a server that stores data, such as an email server or other similar datasource. In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support customer relationship management (CRM) solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

System 125 may include cloud clients 105, cloud platform 115, and data center 120. In some cases, data processing may occur at any of the components of system 125, or at a combination of these components. In some cases, servers may perform the data processing. The servers may be a cloud client 105 or located at data center 120.

In accordance with aspects of the present disclosure, the system 125 may be configured to utilize a combination of real-time connectors and polling connectors for retrieving data from a datasource (e.g., any of contacts 110). The system 125 may use a real-time connector to retrieve data from the datasource as the data is being generated at the datasource. The real-time connector may also record IDs associated with the data it retrieves. The system 125 may also use a polling connector configured to periodically request the IDs of data generated at the datasource. The system 125 may then compare the IDs retrieved from the polling connector request to the IDs retrieved from the real-time connector for a given period of time to determine if all the data generated for that time period was actually retrieved by the real-time connector. If the system 125 determines, based on comparing the IDs recorded by the two connectors, that the real-time connector missed some data, the polling connector may request the data from the datasource corresponding to the missing IDs.

Figure 2:
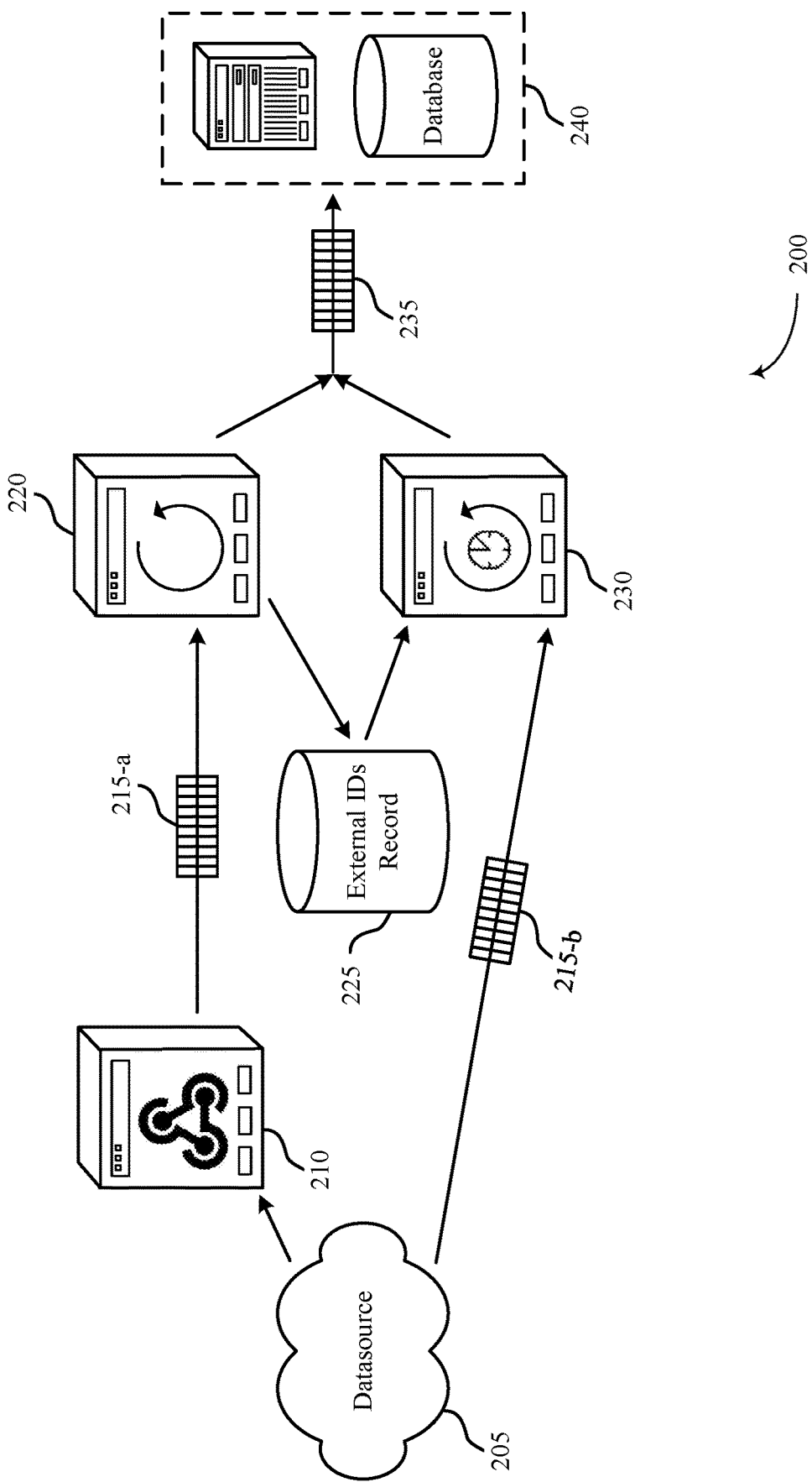

FIG. 2 illustrates an example of a system 200 for communication data processing that supports synergizing real-time and polling connectors for data ingestion in accordance with various aspects of the present disclosure. The system 200 may include webhook 210, collector 220, and verifier 230, which may be examples of components of system 125, as described with reference to FIG. 1. For example, webhook 210, collector 220, or verifier 230 may be parts of a data center 120, a cloud platform 115, or a cloud client 105. In some cases, webhook 210, collector 220, and verifier 230 may be components of the same device. In some cases, the processes performed by webhook 210, collector 220, and verifier 230 may be performed by a server or group of servers. In other cases, the processes may be performed by a user device (e.g., a smartphone, a laptop, a desktop computer, a tablet, a sensor, or another computing device or system capable of processing or analyzing data) or a group of user devices. Additionally, system 240 may be components of any part of system 125. System 240 may include servers, user devices, databases, or any other device or system capable of processing or storing data from a data channel 235.

The system 200 may use a connector to retrieve data from an external datasource and write the data to a channel for use by other systems or processes. A connector may include a combination of components (e.g., webhook 210, collector 220, and/or verifier 230) and processes, and may also be referred to as a crawler or a data crawler. The data retrieved by a connector may be a new communication event (e.g., an email, a calendar event, a phone call, etc.). A connector may retrieve the data from a datasource 205 of a datasource provider (e.g., gmail, gcal, exchange, etc.). In some cases, a connector may read data of multiple datatypes or from multiple datasources 205. The connector may include a fan-out process, which may create multiple copies of the data for use in multiple different downstream processes. The connector may normalize the data into a schema, such as a registered schema. For example, the connector may convert data of different datatypes into data of a same schema. The connector may write the data to a data channel 235. The data channel 235 may be an example of a queue (e.g., a distributed queue, such as a Kafka queue). The queue, and the corresponding data, may be consumed by a downstream system 240. The downstream system 240 may include a processor (e.g., a timeline processor) for processing the data, as well as database or a data lake for storing the data. In some cases, the connector may write the data to multiple data channels 235 or queues.

The system 200 may include a real-time connector, which may include the webhook 210 and the collector 220. The webhook 210 and collector 220 may be implemented at a same server or user device. In some cases, the functions performed by the webhook 210 may be included in the functionality of the collector 220. The webhook 210 and collector 220 may run continuously to retrieve data as it is generated at the datasource 205. In some cases, the webhook 210 may transmit an initial webhook request message to the datasource 205 requesting notification messages for events occurring after the initial webhook request message. The initial webhook request message may be sent once for a datasource 205 (e.g., upon initial registration), or it may need to be sent periodically based on the configuration of the datasource 205 (e.g., to refresh the access permissions of the collector 220). The collector 220 may then receive a signal from the datasource 205 (e.g., via the webhook 210). The signal may be a notification corresponding to an event (e.g., new data generated) occurring after the initial webhook request message. The collector 220 may determine that a change in the data at the datasource 205 has occurred based on the notification.

The collector 220 may read data (e.g., from data queue 215-a) from the datasource 205 via the webhook 210 as the data is generated at the datasource 205. The data may include external IDs associated with each element of the data (e.g., identifying each email). The collector 220 may record the external IDs of the data in an external IDs database 225, for example. The collector 220 may normalize the data into a schema and write the data to a data channel 235. In some cases, the collector 220 may implement an at-least once semantic (i.e., all data is read, and some data may be read more than once). In other cases, the collector 220 may implement an at-most-once or an exactly-once semantic. In some cases, additional webhook request messages may be transmitted to other datasource providers so that the collector 220 can retrieve data from multiple datasources.

The system 200 may also include a polling connector in addition to the real-time connector. The polling connector may include the verifier 230. The verifier 230 may operate similarly to the collector 220, but may retrieve data periodically at a configured frequency instead of in real time. For example, the verifier 230 may request data in a batch that was generated after a given point in time (e.g., since a previous watermark). In some cases, the verifier 230 may transmit a batch request message to the datasource provider requesting notification messages corresponding to events occurring during a designated time period occurring prior to the batch request message (e.g., since the last watermark).

The verifier 230 may receive metadata associated with a batch of data from datasource 205 (e.g., in response to the batch request message). The batch of data may represent data that was generated over a certain period of time (e.g., data that was generated over the last hour). The length of time (e.g., the size of the data bucket) may be specified by the datasource provider.

The verifier 230 may read the metadata, which may include external IDs associated with the data in the batch of data. The verifier 230 may compare the external IDs of the data in the batch of data to the external IDs recorded and stored by the collector 220 for the same period of time (e.g., since the last watermark). In some cases, the verifier 230 may identify one or more external IDs that were included in the metadata for the batch of data, but that were not recorded by the collector 220. The one or more missing external IDs may indicate that the collector 220 failed to retrieve the data associated with those external IDs.

The verifier 230 may then request the data from the datasource 205 associated with the missing IDs. In this way, the verifier 230 may catch any data that was missed by the collector 220. The verifier 230 may then update a watermark indicating that all the data generated at the datasource 205 for a given period of time has been received by the system 200. The process of requesting IDs of newly generated data for a given period of time, verifying that all the data has been received, and requesting any missing data may be repeated at a periodicity that is configurable.

The verifier 230 may normalize the data it retrieves into a schema, and write the data to the data channel 235 (in a similar fashion as collector 220). In some cases, the external IDs identified by the verifier 230 and recorded by the collector 220 for a given period of time may match, which may indicate that the collector 220 retrieved all the data generated over that time period. In these cases, the verifier 230 may not request any data from the datasource 205 or write any data to the data channel 235. The verifier 230 may implement the above process for multiple datasources 205 and datasource providers. In some cases, the time bucket sizes of the batches of data may be different for different datasources 205 or datasource providers. The polling connector may be configured to handle different time bucket sizes. For example, normalizing data into a schema may include converting the data in different time bucket sizes into a standard data type.

In some examples, the system 200 may include an onboarder. The onboarder may run when a connector is registered with a datasource 205 for the first time. In some cases, the onboarder may transmit an onboarding request message to the datasource provider. The onboarder may read previously generated data from the datasource 205. For example, the onboarder may set a special watermark to indicate a time that the connector first reads data from the datasource 205. For example, the onboarder may read data corresponding to emails sent or received before the time indicated by the special watermark. The onboarder may read the previous data in reverse order (e.g., start with the most recent data, and progress towards the least recent). In some cases, the onboarder may read a set amount of data for an initial time period (e.g., as defined in the onboarding request message). In some cases, the onboarder may read data for a certain configurable time period, and may not read data before the certain configurable time period. For example, the onboarder may read data from the six months prior to the special watermark, but may not read data generated before the six months. In other cases, the onboarder may perform a full synchronization (e.g., read all data prior to the special watermark). The onboarder may read the data in several iterative steps.

In some examples, a connector may include a refresher. For example, a datasource provider may require a user to input an access token to access a datasource 205 periodically. The datasource provider may restrict access to the datasource 205 after a certain time period following the inputting of the access token (e.g., the access token may expire). In some cases, the user may initially input the access token. The refresher may periodically re-input the access token following the initial input.

In a particular example, the system 200 may implement real-time and polling connectors as described above to ingest data from an email server (e.g., gmail). The email server may be configured to send a notification message when a new email arrives for a particular user or account. The collector 220 may receive the notification message (e.g., via the webhook 210), and may request the data associated with the notification. The collector 220 may read the data associated with the new email and write the data to the data channel 235. The collector 220 may also record an external ID of the new email in an external IDs database 225. In some cases, the collector 220 may miss a notification message (e.g., due to a network error) when a new email is generated at the email server.

The verifier 230 may periodically request and receive metadata including external IDs associated with batches of emails generated at the email server over a period of time (e.g. since a last watermark). The verifier 230 may compare the IDs associated with the emails to the IDs in the external IDs database 225 for the same period of time. If the verifier 230 determines that an ID for an email is missing from the external IDs database 225, the verifier 230 may request the email associated with that ID from the datasource 205, retrieve the missing email, and write the email to the data channel 235.

Figure 3:
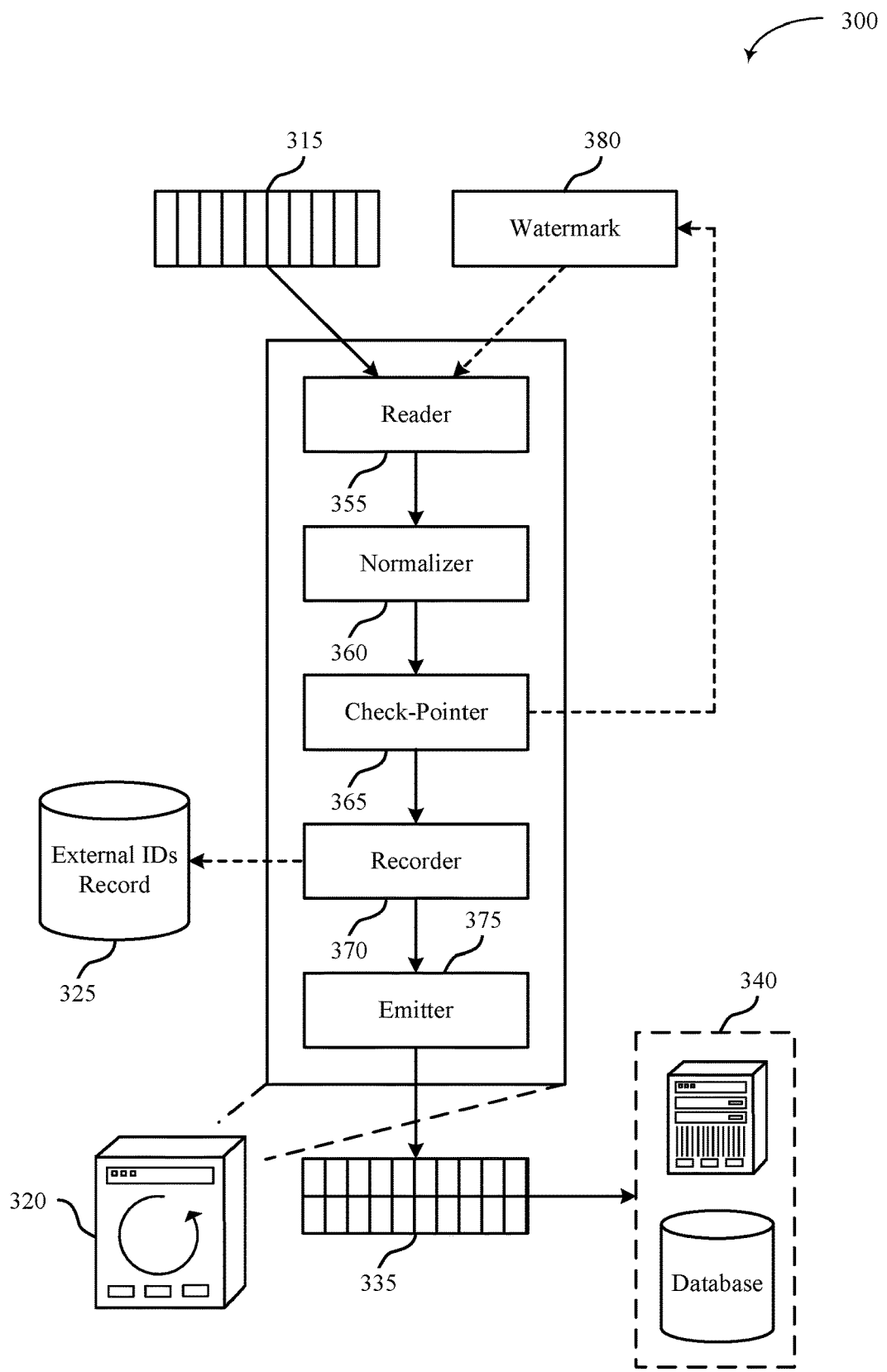
FIG. 3 illustrates an example of a real-time connector that supports synergizing real-time and polling connectors for data ingestion in accordance with aspects of the present disclosure.

FIG. 3 illustrates an example of a real-time connector 300 and the associated processes that support synergizing real-time and polling connectors for data ingestion in accordance with various aspects of the present disclosure. Data queue 315, collector 320, external IDs database 325, data channel 335, and system 340 may be examples of the corresponding devices or systems described with reference to FIG. 2. In some cases, the collector 320 may additionally include functions performed by the webhook 210 as described with reference to FIG. 2. In some cases, the collector 320 may be implemented in a server or a user device. For example, the collector 330 may be a component of any part of system 125 as described with reference to FIG. 1. Similarly, system 340 may include components of various parts of system 125.

The collector 320 may receive data from a datasource in the form of a data queue 315. In some cases, the data may be associated with communication events. For example, the datasource may recognize that a new communication event has occurred (e.g., an email, a calendar invite, a service ticket, a short message service (SMS) text message, a voice call, a transcription of a voice call, a social media message, or any other form of electronic communication or data). The collector 320 may include multiple components or processes such as reader 355, normalizer 360, check-pointer 365, recorder 370, and/or emitter 375 that are configured to retrieve data from a datasource, record external IDs, and write the data to a downstream data channel 335.

The datasource may notify the collector 320 via a webhook of the new communication event, and the collector 320 may receive data associated with the new communication event in the data queue 315. In some cases, the collector 320 may additionally receive a watermark 380. The watermark 380 may indicate a time that data was most recently received by the collector 320. Both the data queue 315 and the watermark 380 may be received by a reader 355. The reader 355 may read data from the datasource with a timestamp specifying a time later than the watermark 380. In some cases, the reader 355 may operate continuously. The reader 355 may receive data from multiple datasources and datasource providers.

The reader 355 may send the data to a normalizer 360. The normalizer 360 may normalize the data to a common schema. In some cases, the common schema may be an example of a registered schema (e.g., for an Apache Kafka queue). Normalizing the data may allow for data from multiple datasources and datasource providers to be written to a same data channel 335. The data from multiple datasources and datasource providers may also be processed and stored based on the common schema.

A check-pointer 365 may update the watermark 380. For example, the check-pointer 365 may set the watermark 380 to indicate a time that the data was received by the reader 355. A recorder 370 may update a set of identifiers for read data. For example, the recorder 370 may receive the data and may identify one or more identifiers of the data. In some cases, the one or more identifiers may be external IDs. The recorder 370 may record the one or more identifiers of the data in the set of identifiers to an external IDs database 325.

An emitter 375 may transmit the data to a data channel 335. The data channel 335 may receive data formatted in the common schema. In some cases, the data channel 335 may be an example of a queue. The data channel 335 may send the data to downstream processing and storage. For example, the data channel 335 may send the data to a system 340, which may include servers, databases, user devices, or any other devices or systems that support processing or storing data.

Figure 4:
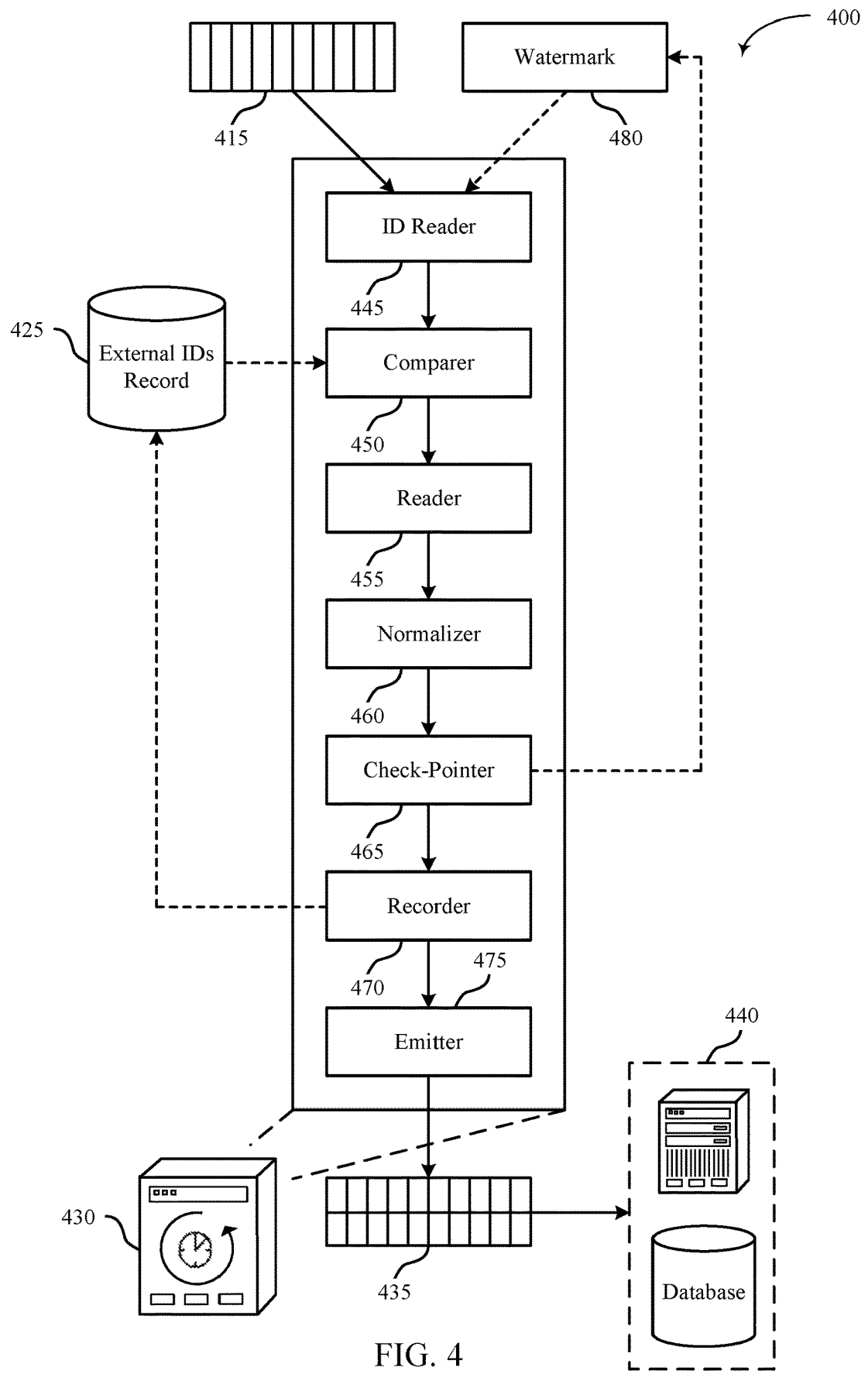
FIG. 4 illustrates an example of a polling connector that supports synergizing real-time and polling connectors for data ingestion in accordance with aspects of the present disclosure.

FIG. 4 illustrates an example of a polling connector 400 and the associated processes that support synergizing real-time and polling connectors for data ingestion in accordance with various aspects of the present disclosure. Data queue 415, external IDs database 425, data channel 435, and system 440 may be examples of the corresponding devices or systems described with reference to FIGS. 2 and 3. Verifier 430 may be an example of the verifier 230 as described with reference to FIG. 2. In some cases, the verifier 430 may be implemented in a server or a user device. For example, the verifier 430 may be a component of any part of system 125 as described with reference to FIG. 1. Similarly, system 440 may include components of various parts of system 125.

The verifier 430 may receive data and/or metadata from a datasource in the form of a data queue 415. In some cases, the data may be associated with communication events. Additionally, in some cases, the verifier 430 may receive a watermark 480. The watermark 480 may indicate a time that a previous batch of data was received by the verifier 430. The verifier 430 may operate at a predetermined periodicity. In some cases, the predetermined periodicity may be based on the datasource or datasource provider. For example, the verifier 430 may remain idle when not operating, and may periodically wake-up (e.g., once every hour for one datasource, once every half hour for another datasource) to receive metadata and/or a batch of data from the datasource. The batch of data may include data associated with communication events that occurred after the watermark 480. In some cases, the verifier 430 may transmit a message to the datasource each time the verifier 430 requests a batch of data. In other cases, the verifier 430 may transmit a message indicating the predetermined periodicity to the datasource provider of the datasource, and based on the predetermined periodicity, the datasource may periodically send metadata and/or a batch of data to the verifier 430 without receiving periodic requests from the verifier 430.

The verifier 430 may include multiple components or processes such as ID reader 445, comparer 450, reader 455, normalizer 460, check-pointer 465, recorder 470, and/or emitter 475 that are configured to retrieve data from a datasource provider, compare external IDs, and write the data to a data channel 435. The ID reader 445 may receive the watermark 480 and metadata (including external IDs) associated with the batch of data in the data queue 415. The ID reader 445 may identify one or more IDs associated with the batch of data. In some cases, receiving and processing the metadata associated with a batch of data instead of the data itself may decrease the overhead and save on processing time and power. The ID reader 445 may send the one or more IDs of the batch of data to a comparer 450.

The comparer 450 may receive the one or more IDs of the batch of data, and may additionally receive a recorded set of IDs (e.g., from the collector 320 as described with reference to FIG. 3). For example, the comparer 450 may receive the recorded set of IDs from an external IDs database 425. The comparer 450 may compare the one or more IDs from the batch of data to the recorded set of IDs to determine of all the data for a given period of time was previously retrieved. In some cases, the comparer 450 may determine that an ID of the batch of data is not present in the recorded set of IDs. For example, the datasource provider of the database may have failed to send a push notification when a new communication event occurred and the collector 320 may not have received data associated with the new communication event. In response to determining that an ID of the batch of data was not previously recorded in the external IDs database 425, the verifier 430 may request the data associated with the missing ID from the datasource. The reader 455 may receive the missing data and read the data indicated by the one or more missing IDs.

In some cases, the verifier 430 may request the full batch of data corresponding to a period of time. If the full batch of data was received, the reader 455 may only read data associated with the missing IDs. In this way, the verifier 430 may read data missed by the collector 320, and may not read data previously read by the collector 320. The verifier 430 may read data missed by the collector 320 without redundantly reading data already read by the collector 320. The reader 455 may send the read data to the normalizer 460.

The normalizer 460, check-pointer 465, recorder 470, and emitter 475 may perform similar functions to those described with respect to FIG. 3 by the corresponding normalizer 360, check-pointer 365, recorder 370, and emitter 375. For example, the normalizer 460 may receive the read data from the reader 455, and may write the read data to a common schema. The check-pointer 465 may update the watermark 480 to indicate a time when the batch of data was received by the verifier 430. The recorder 470 may record the one or more IDs sent from the comparer 450 to the reader 455. In some cases, the recorder 470 may record the one or more IDs in the external IDs database 425. The emitter 475 may send the data to a data channel 435, which may be an example of a queue. The data channel 435 may send the data to a system 440, which may include servers, databases, user devices, or any other devices or systems for processing and storing the data.

Figure 5:
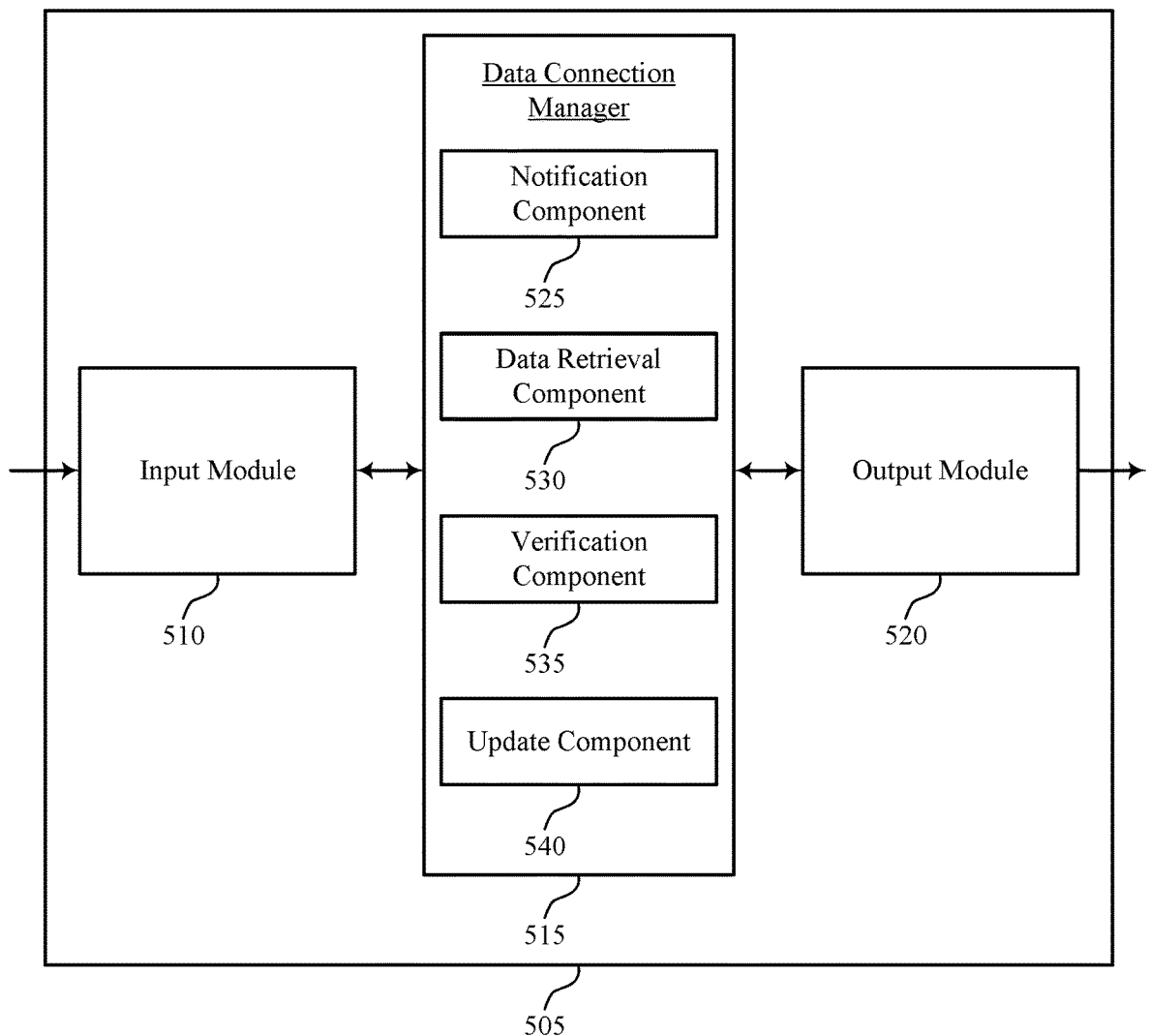
FIGS. 5 through 6 show block diagrams of a system that supports synergizing real-time and polling connectors for data ingestion in accordance with aspects of the present disclosure.

FIG. 5 shows a block diagram 500 of a system 505 that supports synergizing real-time and polling connectors for data ingestion in accordance with various aspects of the present disclosure. System 505 may include input module 510, data connection manager 515, and output module 520. System 505 may also include a processor. Each of these components may be in communication with one another (e.g., via one or more buses). In some cases, system 505 may be an example of a user terminal, a database server, or a system containing multiple computing devices. Data connection manager 515 may be an example of aspects of the data connection manager 715 described with reference to FIG. 7. Data connection manager 515 may also include notification component 525, data retrieval component 530, verification component 535, and update component 540.

Data connection manager 515 and/or at least some of its various sub-components may be implemented in hardware, software executed by a processor, firmware, or any combination thereof. If implemented in software executed by a processor, the functions of the data connection manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The data connection manager 515 and/or at least some of its various sub-components may be physically located at various positions, including being distributed such that portions of functions are implemented at different physical locations by one or more physical devices. In some examples, data connection manager 515 and/or at least some of its various sub-components may be a separate and distinct component in accordance with various aspects of the present disclosure. In other examples, data connection manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Notification component 525 may transmit a webhook request message to a datasource provider, where the webhook request message includes a request for notification messages corresponding to events occurring after the webhook request message. The notification component 525 may also transmit a batch request message to the datasource provider, where the batch request message includes a request for notification messages corresponding to events occurring during a designated time period occurring prior to the batch request message. The notification component 525 may also transmit a real-time request message to the datasource provider, where the real-time request message includes a request for data corresponding to one or more first event identifiers. The notification component 525 may also transmit a subsequent batch request message to the datasource provider, where the subsequent batch request message includes a request for only data corresponding to the one or more second event identifiers that are missing from the one or more first event identifiers. Notification component 525 may transmit the batch request message at a predetermined periodic interval. Additionally, notification component 525 may transmit an onboarding request message to the datasource provider, where the onboarding request message includes a request for data corresponding to events occurring during an additional designated time period occurring prior to the webhook request message, and may transmit an additional webhook request message to an additional datasource provider.

Data retrieval component 530 may receive a first notification message from the datasource provider in response to the webhook request message, where the first notification message includes one or more first event identifiers; receive a second notification message from the datasource provider in response to the batch request message, where the second notification message includes one or more second event identifiers; receive only the data corresponding to the one or more second event identifiers that are missing from the one or more first event identifiers; receive the data corresponding to the one or more first event identifiers; receive the data corresponding to the one or more first event identifiers in response to the webhook request message; and receive the data corresponding to the additional designated time period.

Verification component 535 may compare the one or more first event identifiers with the one or more second event identifiers, determine that at least one of the one or more second event identifiers are missing from the one or more first event identifiers, and determine that the one or more second event identifiers are equal to the one or more first event identifiers. Update component 540 may update a first database based on the comparison.

Figure 6:
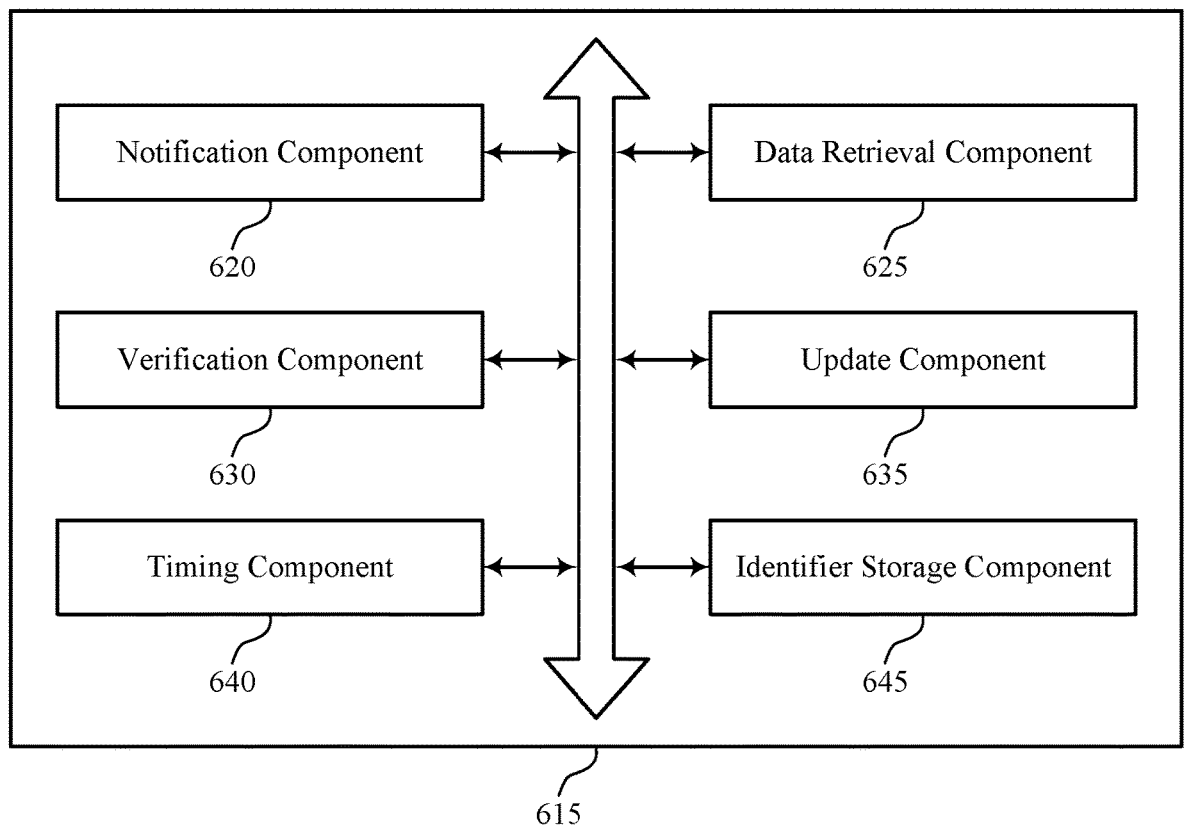

FIG. 6 shows a block diagram 600 of a data connection manager 615 that supports synergizing real-time and polling connectors for data ingestion in accordance with various aspects of the present disclosure. The data connection manager 615 may be an example of aspects of a data connection manager 515 or 715 described with reference to FIGS. 5 and 7. The data connection manager 615 may include notification component 620, data retrieval component 625, verification component 630, update component 635, timing component 640, and identifier storage component 645. Each of these modules may communicate, directly or indirectly, with one another (e.g., via one or more buses).

Notification component 620 may transmit a webhook request message to a datasource provider, where the webhook request message includes a request for notification messages corresponding to events occurring after the webhook request message; transmit a real-time request message to the datasource provider, where the real-time request message includes a request for data corresponding to one or more first event identifiers; transmit a batch request message to the datasource provider, where the batch request message includes a request for notification messages corresponding to events occurring during a designated time period occurring prior to the batch request message; and transmit a subsequent batch request message to the datasource provider, where the subsequent batch request message includes a request for only data corresponding to the one or more second event identifiers that are missing from the one or more first event identifiers. Notification component 620 may transmit the batch request message at a predetermined periodic interval. Additionally, notification component 620 may transmit an onboarding request message to the datasource provider, where the onboarding request message includes a request for data corresponding to events occurring during an additional designated time period occurring prior to the webhook request message, and may transmit an additional webhook request message to an additional datasource provider.

Data retrieval component 625 may receive a first notification message from the datasource provider in response to the webhook request message, where the first notification message includes one or more first event identifiers; receive a second notification message from the datasource provider in response to the batch request message, where the second notification message includes one or more second event identifiers; receive only the data corresponding to the one or more second event identifiers that are missing from the one or more first event identifiers; receive the data corresponding to the one or more first event identifiers, receive data corresponding to the one or more first event identifiers in response to the webhook request message; and receive the data corresponding to the additional designated time period.

Verification component 630 may compare the one or more first event identifiers with the one or more second event identifiers, determine that at least one of the one or more second event identifiers are missing from the one or more first event identifiers, and determine that the one or more second event identifiers are equal to the one or more first event identifiers. Update component 635 may update a first database based on the comparison.

Timing component 640 may identify a timestamp, where the designated time period occurring prior to the batch request message ranges from the timestamp to when the batch request message was transmitted. In some cases, the designated time period occurring prior to the batch request message is based on the datasource provider. Identifier storage component 645 may store the one or more first event identifiers in a second database.

Figure 7:
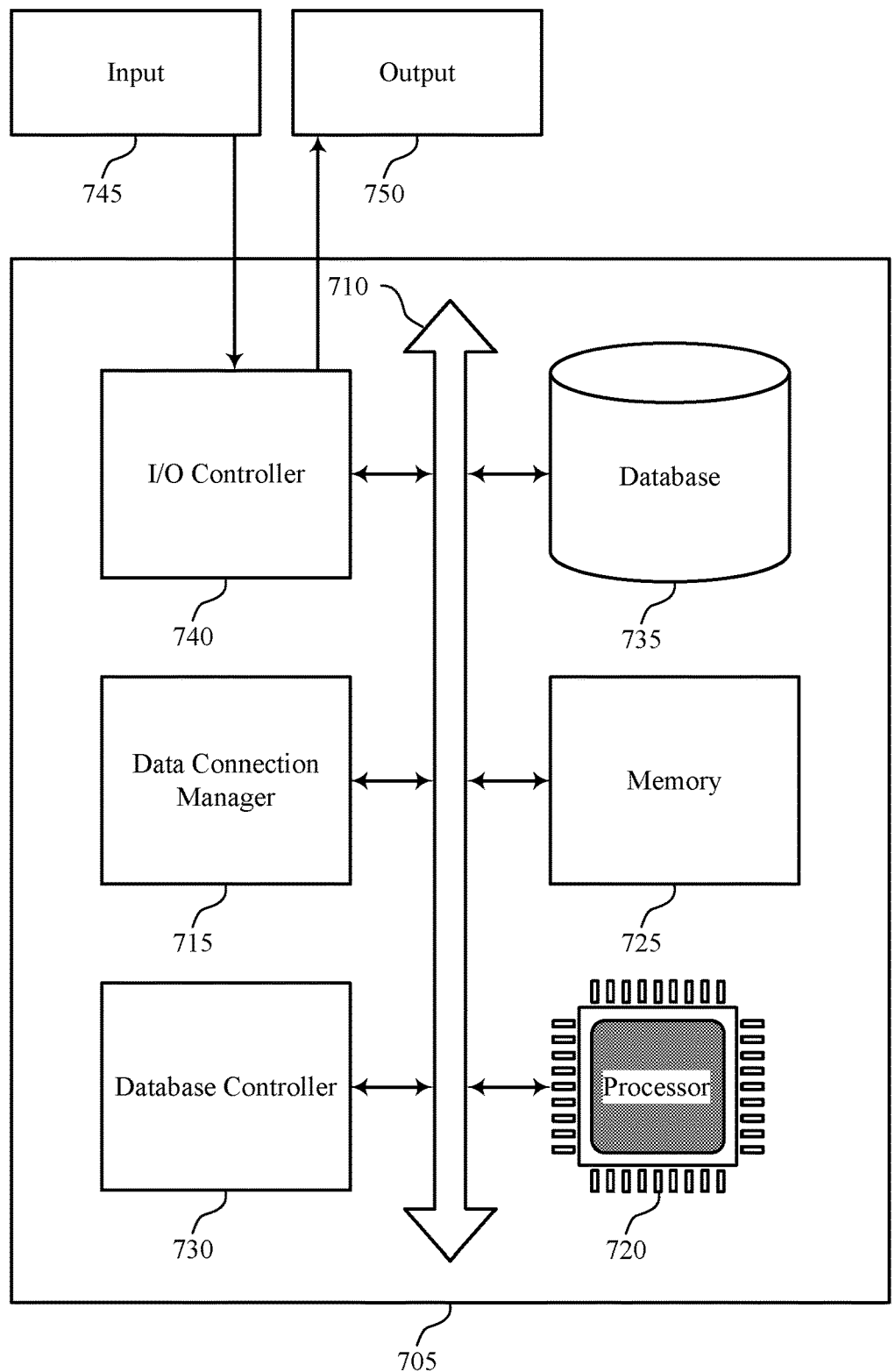
FIG. 7 illustrates a block diagram of a system including a data connection manager that supports synergizing real-time and polling connectors for data ingestion in accordance with aspects of the present disclosure.

FIG. 7 shows a diagram of an environment 700 including a system 705 that supports synergizing real-time and polling connectors for data ingestion in accordance with various aspects of the present disclosure. System 705 may be an example of or include the components of system 125 as described above, e.g., with reference to FIG. 1. System 705 may include components for bi-directional data communications including components for transmitting and receiving communications, including data connection manager 715, processor 720, memory 725, database controller 730, database 735, and I/O controller 740. These components may be in electronic communication via one or more busses (e.g., bus 710).

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting synergizing real-time and polling connectors for data ingestion).

Memory 725 may include random access memory (RAM) and read only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware and/or software operation such as the interaction with peripheral components or devices.

Database controller 730 may manage data storage and processing in database 735. In some cases, a user may interact with database controller 730. In other cases, database controller 730 may operate automatically without user interaction. Database 735 may be an example of a single database, a distributed database, multiple distributed databases, or an emergency backup database.

I/O controller 740 may manage input and output signals for system 705. I/O controller 740 may also manage peripherals not integrated into system 705. In some cases, I/O controller 740 may represent a physical connection or port to an external peripheral. In some cases, I/O controller 740 may utilize an operating system such as iOS®, ANDROID®, MS-DOS®, MS-WINDOWS®, OS/2®, UNIX®, LINUX®, or another known operating system. In other cases, I/O controller 740 may represent or interact with a modem, a keyboard, a mouse, a touchscreen, or a similar device. In some cases, I/O controller 740 may be implemented as part of a processor. In some cases, a user may interact with system, 705 via I/O controller 740 or via hardware components controlled by I/O controller 740.

Figure 8:
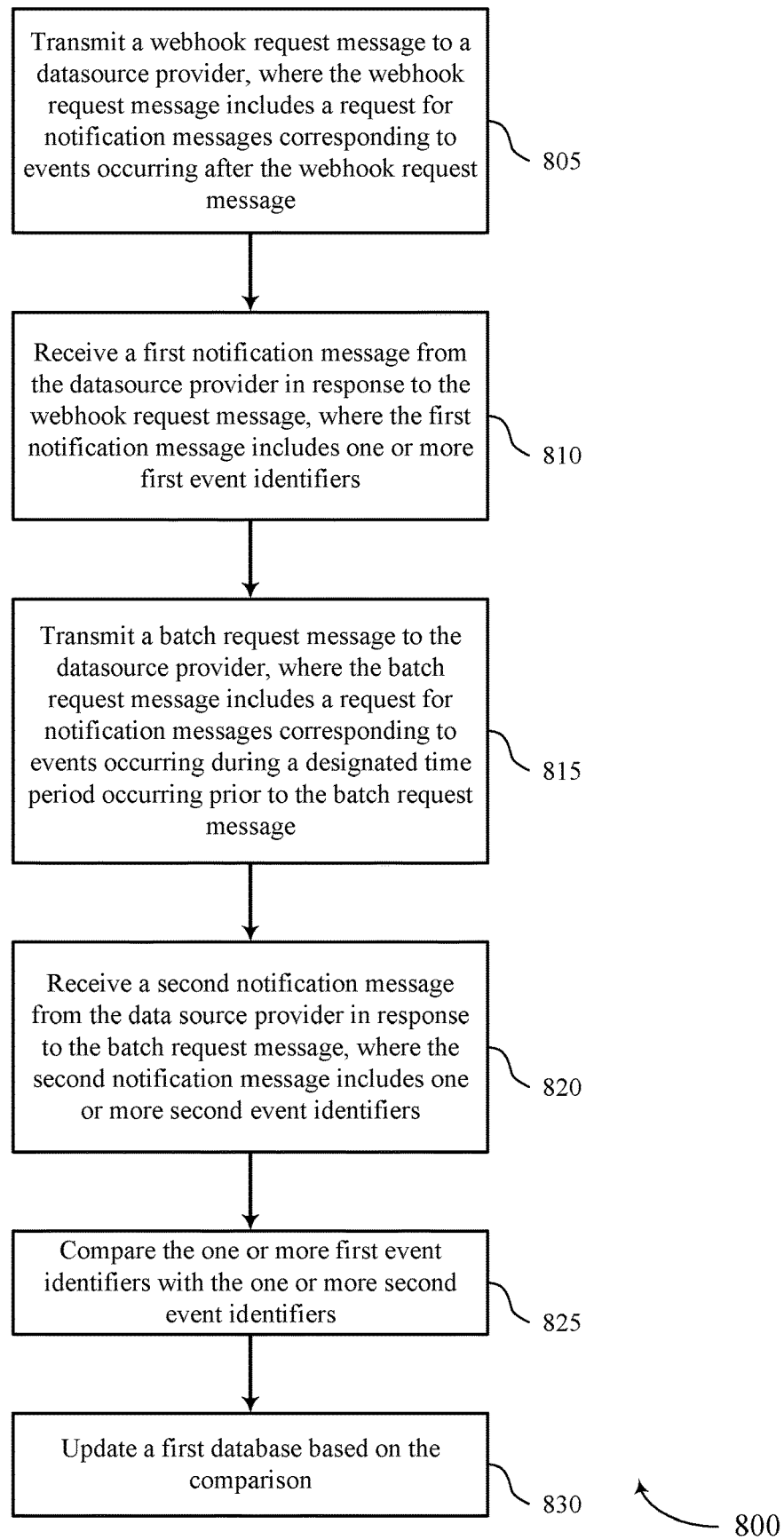
FIGS. 8 through 9 illustrate methods for synergizing real-time and polling connectors for data ingestion in accordance with aspects of the present disclosure.

FIG. 8 shows a flowchart illustrating a method 800 for synergizing real-time and polling connectors for data ingestion in accordance with various aspects of the present disclosure. The operations of method 800 may be implemented by a data connection manager or its components as described herein. For example, the operations of method 800 may be performed by a data connection manager 515, 615, or 715 as described with reference to FIGS. 5 through 7. In some examples, a data connection manager may execute a set of codes to control the functional elements of the device to perform the functions described below. Additionally or alternatively, the data connection manager may perform aspects of the functions described below using special-purpose hardware.

At block 805 the data connection manager 515, 615, or 715 may transmit a webhook request message to a datasource provider, wherein the webhook request message comprises a request for notification messages corresponding to events occurring after the webhook request message. The operations of block 805 may be performed according to the methods described with reference to FIGS. 1 through 4. In certain examples, aspects of the operations of block 805 may be performed by a notification component as described with reference to FIGS. 5 through 7.

At block 810 the data connection manager 515, 615, or 715 may receive a first notification message from the datasource provider in response to the webhook request message, wherein the first notification message comprises one or more first event identifiers. The operations of block 810 may be performed according to the methods described with reference to FIGS. 1 through 4. In certain examples, aspects of the operations of block 810 may be performed by a data retrieval component as described with reference to FIGS. 5 through 7.

At block 815 the data connection manager 515, 615, or 715 may transmit a batch request message to the datasource provider, wherein the batch request message comprises a request for notification messages corresponding to events occurring during a designated time period occurring prior to the batch request message. The operations of block 815 may be performed according to the methods described with reference to FIGS. 1 through 4. In certain examples, aspects of the operations of block 815 may be performed by a notification component as described with reference to FIGS. 5 through 7.

At block 820 the data connection manager 515, 615, or 715 may receive a second notification message from the datasource provider in response to the batch request message, wherein the second notification message comprises one or more second event identifiers. The operations of block 820 may be performed according to the methods described with reference to FIGS. 1 through 4. In certain examples, aspects of the operations of block 820 may be performed by a data retrieval component as described with reference to FIGS. 5 through 7.

At block 825 the data connection manager 515, 615, or 715 may compare the one or more first event identifiers with the one or more second event identifiers. The operations of block 825 may be performed according to the methods described with reference to FIGS. 1 through 4. In certain examples, aspects of the operations of block 825 may be performed by a verification component as described with reference to FIGS. 5 through 7.

At block 830 the data connection manager 515, 615, or 715 may update a first database based at least in part on the comparison. The operations of block 830 may be performed according to the methods described with reference to FIGS. 1 through 4. In certain examples, aspects of the operations of block 830 may be performed by an update component as described with reference to FIGS. 5 through 7.

Figure 9:
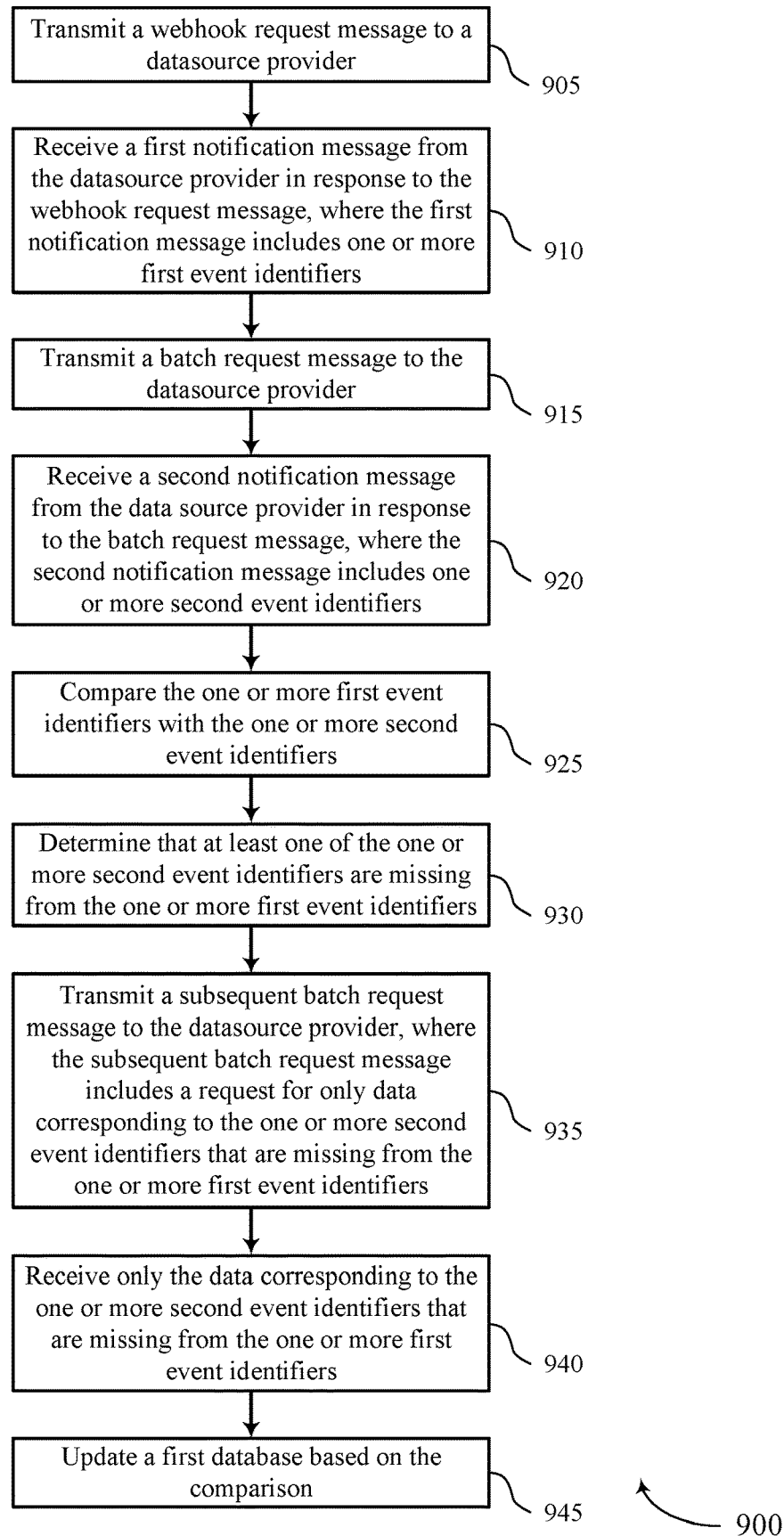

FIG. 9 shows a flowchart illustrating a method 900 for synergizing real-time and polling connectors for data ingestion in accordance with various aspects of the present disclosure. The operations of method 900 may be implemented by a data connection manager or its components as described herein. For example, the operations of method 900 may be performed by a data connection manager 515, 615, or 715 as described with reference to FIGS. 5 through 7. In some examples, a data connection manager may execute a set of codes to control the functional elements of the device to perform the functions described below. Additionally or alternatively, the data connection manager may perform aspects of the functions described below using special-purpose hardware.

At block 905 the data connection manager 515, 615, or 715 may transmit a webhook request message to a datasource provider, wherein the webhook request message comprises a request for notification messages corresponding to events occurring after the webhook request message. The operations of block 905 may be performed according to the methods described with reference to FIGS. 1 through 4. In certain examples, aspects of the operations of block 905 may be performed by a notification component as described with reference to FIGS. 5 through 7.

At block 910 the data connection manager 515, 615, or 715 may receive a first notification message from the datasource provider in response to the webhook request message, wherein the first notification message comprises one or more first event identifiers. The operations of block 910 may be performed according to the methods described with reference to FIGS. 1 through 4. In certain examples, aspects of the operations of block 910 may be performed by a data retrieval component as described with reference to FIGS. 5 through 7.

At block 915 the data connection manager 515, 615, or 715 may transmit a batch request message to the datasource provider, wherein the batch request message comprises a request for notification messages corresponding to events occurring during a designated time period occurring prior to the batch request message. The operations of block 915 may be performed according to the methods described with reference to FIGS. 1 through 4. In certain examples, aspects of the operations of block 915 may be performed by a notification component as described with reference to FIGS. 5 through 7.

At block 920 the data connection manager 515, 615, or 715 may receive a second notification message from the datasource provider in response to the batch request message, wherein the second notification message comprises one or more second event identifiers. The operations of block 920 may be performed according to the methods described with reference to FIGS. 1 through 4. In certain examples, aspects of the operations of block 920 may be performed by a data retrieval component as described with reference to FIGS. 5 through 7.

At block 925 the data connection manager 515, 615, or 715 may compare the one or more first event identifiers with the one or more second event identifiers. The operations of block 925 may be performed according to the methods described with reference to FIGS. 1 through 4. In certain examples, aspects of the operations of block 925 may be performed by a verification component as described with reference to FIGS. 5 through 7.

At block 930 the data connection manager 515, 615, or 715 may determine that at least one of the one or more second event identifiers are missing from the one or more first event identifiers. The operations of block 930 may be performed according to the methods described with reference to FIGS. 1 through 4. In certain examples, aspects of the operations of block 930 may be performed by a verification component as described with reference to FIGS. 5 through 7.

At block 935 the data connection manager 515, 615, or 715 may transmit a subsequent batch request message to the datasource provider, wherein the subsequent batch request message comprises a request for only data corresponding to the one or more second event identifiers that are missing from the one or more first event identifiers. The operations of block 935 may be performed according to the methods described with reference to FIGS. 1 through 4. In certain examples, aspects of the operations of block 935 may be performed by a notification component as described with reference to FIGS. 5 through 7.

At block 940 the data connection manager 515, 615, or 715 may receive only the data corresponding to the one or more second event identifiers that are missing from the one or more first event identifiers. The operations of block 940 may be performed according to the methods described with reference to FIGS. 1 through 4. In certain examples, aspects of the operations of block 940 may be performed by a data retrieval component as described with reference to FIGS. 5 through 7.

At block 945 the data connection manager 515, 615, or 715 may update a first database based at least in part on the comparison. The operations of block 945 may be performed according to the methods described with reference to FIGS. 1 through 4. In certain examples, aspects of the operations of block 945 may be performed by an update component as described with reference to FIGS. 5 through 7.

A method of communication data processing is described. The method may include transmitting a webhook request message to a datasource provider, wherein the webhook request message comprises a request for notification messages corresponding to events occurring after the webhook request message, receiving a first notification message from the datasource provider in response to the webhook request message, wherein the first notification message comprises one or more first event identifiers, transmitting a batch request message to the datasource provider, wherein the batch request message comprises a request for notification messages corresponding to events occurring during a designated time period occurring prior to the batch request message, receiving a second notification message from the datasource provider in response to the batch request message, wherein the second notification message comprises one or more second event identifiers, comparing the one or more first event identifiers with the one or more second event identifiers, and updating a first database based at least in part on the comparison.

Another apparatus for communication data processing is described. The apparatus may include a processor, memory in electronic communication with the processor, and instructions stored in the memory. The instructions may be operable to cause the processor to transmit a webhook request message to a datasource provider, wherein the webhook request message comprises a request for notification messages corresponding to events occurring after the webhook request message, receive a first notification message from the datasource provider in response to the webhook request message, wherein the first notification message comprises one or more first event identifiers, transmit a batch request message to the datasource provider, wherein the batch request message comprises a request for notification messages corresponding to events occurring during a designated time period occurring prior to the batch request message, receive a second notification message from the datasource provider in response to the batch request message, wherein the second notification message comprises one or more second event identifiers, compare the one or more first event identifiers with the one or more second event identifiers, and update a first database based at least in part on the comparison.

A non-transitory computer readable medium for communication data processing is described. The non-transitory computer-readable medium may include instructions operable to cause a processor to transmit a webhook request message to a datasource provider, wherein the webhook request message comprises a request for notification messages corresponding to events occurring after the webhook request message, receive a first notification message from the datasource provider in response to the webhook request message, wherein the first notification message comprises one or more first event identifiers, transmit a batch request message to the datasource provider, wherein the batch request message comprises a request for notification messages corresponding to events occurring during a designated time period occurring prior to the batch request message, receive a second notification message from the datasource provider in response to the batch request message, wherein the second notification message comprises one or more second event identifiers, compare the one or more first event identifiers with the one or more second event identifiers, and update a first database based at least in part on the comparison.

Some examples of the method, apparatus, and non-transitory computer-readable medium described above may further include processes, features, means, or instructions for determining that at least one of the one or more second event identifiers may be missing from the one or more first event identifiers. Some examples of the method, apparatus, and non-transitory computer-readable medium described above may further include processes, features, means, or instructions for transmitting a subsequent batch request message to the datasource provider, wherein the subsequent batch request message comprises a request for only data corresponding to the one or more second event identifiers that may be missing from the one or more first event identifiers. Some examples of the method, apparatus, and non-transitory computer-readable medium described above may further include processes, features, means, or instructions for receiving only the data corresponding to the one or more second event identifiers that may be missing from the one or more first event identifiers.

Some examples of the method, apparatus, and non-transitory computer-readable medium described above may further include processes, features, means, or instructions for determining that the one or more second event identifiers may be equal to the one or more first event identifiers.

Some examples of the method, apparatus, and non-transitory computer-readable medium described above may further include processes, features, means, or instructions for identifying a timestamp, wherein the designated time period occurring prior to the batch request message ranges from the timestamp to when the batch request message was transmitted.

Some examples of the method, apparatus, and non-transitory computer-readable medium described above may further include processes, features, means, or instructions for transmitting the batch request message at a predetermined periodic interval.

Some examples of the method, apparatus, and non-transitory computer-readable medium described above may further include processes, features, means, or instructions for transmitting a real-time request message to the datasource provider, wherein the real-time request message comprises a request for data corresponding to the one or more first event identifiers. Some examples of the method, apparatus, and non-transitory computer-readable medium described above may further include processes, features, means, or instructions for receiving the data corresponding to the one or more first event identifiers.

Some examples of the method, apparatus, and non-transitory computer-readable medium described above may further include processes, features, means, or instructions for receiving data corresponding to the one or more first event identifiers in response to the webhook request message.

Some examples of the method, apparatus, and non-transitory computer-readable medium described above may further include processes, features, means, or instructions for transmitting an onboarding request message to the datasource provider, where the onboarding request message includes a request for data corresponding to events occurring during an additional designated time period occurring prior to the webhook request message. Some examples of the method, apparatus, and non-transitory computer-readable medium described above may further include processes, features, means, or instructions for receiving the data corresponding to the additional designated time period.

Some examples of the method, apparatus, and non-transitory computer-readable medium described above may further include processes, features, means, or instructions for storing the one or more first event identifiers in a second database.

Some examples of the method, apparatus, and non-transitory computer-readable medium described above may further include processes, features, means, or instructions for transmitting an additional webhook request message to an additional datasource provider.

In some examples of the method, apparatus, and non-transitory computer-readable medium described above, the designated time period occurring prior to the batch request message may be based at least in part on the datasource provider.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for communication data processing, comprising:
    transmitting a webhook request message to a datasource provider, wherein the webhook request message comprises a request for notification messages corresponding to events occurring after the webhook request message;
    receiving a first notification message from the datasource provider in response to the webhook request message, wherein the first notification message comprises one or more first event identifiers corresponding to events occurring at the datasource provider during a first time period;
    receiving data corresponding to the one or more first event identifiers based at least in part on the webhook request message;
    transmitting a batch request message to the datasource provider, wherein the batch request message comprises a request for notification messages corresponding to events occurring during a designated second time period occurring prior to the batch request message wherein the second time period at least partially overlaps with the first time period as an overlapping time period;
    receiving a second notification message from the datasource provider in response to the batch request message, wherein the second notification message comprises one or more second event identifiers;
    comparing the one or more first event identifiers received from the datasource provider in response to the webhook request message and corresponding to events occurring during the overlapping time period with the one or more second event identifiers received from the datasource provider in response to the batch request message and corresponding to events occurring during the overlapping time period to determine whether at least one of the one or more second event identifiers are missing from the one or more first event identifiers;
    determining that at least one of the one or more second event identifiers are missing from the one or more first event identifiers based at least in part on the comparing;
    transmitting a subsequent batch request message to the datasource provider, wherein the subsequent batch request message comprises a request for data corresponding to the one or more second event identifiers that are missing from the one or more first event identifiers; and
    receiving the data corresponding to the one or more second event identifiers that are missing from the one or more first event identifiers based at least in part on the subsequent batch request; and
    updating a first database based at least in part on receiving the data corresponding to the one or more second event identifiers that are missing from the one or more first event identifiers.

2. The method of claim 1, further comprising:
    identifying a timestamp, wherein the designated second time period occurring prior to the batch request message ranges from the timestamp to when the batch request message was transmitted.

3. The method of claim 1, further comprising:
    transmitting the batch request message at a predetermined periodic interval.

4. The method of claim 1, further comprising:
    transmitting a real-time request message to the datasource provider, wherein the real-time request message comprises a request for data corresponding to the one or more first event identifiers, wherein the data corresponding to the one or more first event identifiers are received responsive to transmitting the real-time request message.

5. The method of claim 1, further comprising:
    transmitting an onboarding request message to the datasource provider, where the onboarding request message includes a request for data corresponding to events occurring during an additional designated time period occurring prior to the webhook request message; and
    receiving the data corresponding to the additional designated time period.

6. The method of claim 1, further comprising:
storing the one or more first event identifiers in a second database.

7. The method of claim 1, further comprising:
transmitting an additional webhook request message to an additional datasource provider.

8. The method of claim 1, wherein:
the designated second time period occurring prior to the batch request message is based at least in part on the datasource provider.

9. An apparatus for communication data processing, in a system comprising:
a processor;
memory in electronic communication with the processor; and
instructions stored in the memory and operable, when executed by the processor, to cause the apparatus to:
transmit a webhook request message to a datasource provider, wherein the webhook request message comprises a request for notification messages corresponding to events occurring after the webhook request message;
receive a first notification message from the datasource provider in response to the webhook request message, wherein the first notification message comprises one or more first event identifiers corresponding to events occurring at the datasource provider during a first time period after transmission of the webhook request message;
receive data corresponding to the one or more first event identifiers based at least in part on the webhook request message;
transmit a batch request message to the datasource provider, wherein the batch request message comprises a request for notification messages corresponding to events occurring during a designated second time period occurring prior to the batch request message wherein the second time period at least partially overlaps with the first time period as an overlapping time period;
receive a second notification message from the datasource provider in response to the batch request message, wherein the second notification message comprises one or more second event identifiers;
compare the one or more first event identifiers received from the datasource provider in response to the webhook request message and corresponding to events occurring during the overlapping time period with the one or more second event identifiers received from the datasource provider in response to the batch request message and corresponding to events occurring during the overlapping time period to determine whether at least one of the one or more second event identifiers are missing from the one or more first event identifiers;
determine that at least one of the one or more second event identifiers are missing from the one or more first event identifiers based at least in part on the comparing;
transmit a subsequent batch request message to the datasource provider, wherein the subsequent batch request message comprises a request for data corresponding to the one or more second event identifiers that are missing from the one or more first event identifiers; and
receive the data corresponding to the one or more second event identifiers that are missing from the one or more first event identifiers based at least in part on the subsequent batch request; and
update first database based at least in part on receiving the data corresponding to the one or more second event identifiers that are missing from the one or more first event identifiers.

10. The apparatus of claim 9, wherein the instructions are further executable by the processor to:
transmit a real-time request message to the datasource provider, wherein the real-time request message comprises a request for data corresponding to the one or more first event identifiers, wherein the data corresponding to the one or more first event identifiers are received responsive to transmitting the real-time request message.

11. The apparatus of claim 9, wherein the instructions are further executable by the processor to:
transmit an onboarding request message to the datasource provider, where the onboarding request message includes a request for data corresponding to events occurring during an additional designated time period occurring prior to the webhook request message; and
receive the data corresponding to the additional designated time period.

12. A non-transitory computer readable medium storing code for communication data processing, the code comprising instructions executable by a processor to:
transmit a webhook request message to a datasource provider, wherein the webhook request message comprises a request for notification messages corresponding to events occurring after the webhook request message;
receive a first notification message from the datasource provider in response to the webhook request message, wherein the first notification message comprises one or more first event identifiers corresponding to events occurring at the datasource provider during a first time period after transmission of the webhook request message;
receive data corresponding to the one or more first event identifiers based at least in part on the webhook request message;
transmit a batch request message to the datasource provider, wherein the batch request message comprises a request for notification messages corresponding to events occurring during a designated second time period occurring prior to the batch request message;
receive a second notification message from the datasource provider in response to the batch request message, wherein the second notification message comprises one or more second event identifiers wherein the second time period at least partially overlaps with the first time period as an overlapping time period;
compare the one or more first event identifiers received from the datasource provider in response to the webhook request message and corresponding to events occurring during the overlapping time period with the one or more second event identifiers received from the datasource provider in response to the batch request message and corresponding to events occurring during the overlapping time period to determine whether at least one of the one or more second event identifiers are missing from the one or more first event identifiers; and
determine that at least one of the one or more second event identifiers are missing from the one or more first event identifiers based at least in part on the comparing;

transmit a subsequent batch request message to the datasource provider, wherein the subsequent batch request message comprises a request for data corresponding to the one or more second event identifiers that are missing from the one or more first event identifiers; and receive the data corresponding to the one or more second event identifiers that are missing from the one or more first event identifiers based at least in part on the subsequent batch request; and update first database based at least in part on receiving the data corresponding to the one or more second event identifiers that are missing from the one or more first event identifiers.

13. The non-transitory computer-readable medium of claim 12, wherein the instructions are further executable by the processor to:

transmit a real-time request message to the datasource provider, wherein the real-time request message comprises a request for data corresponding to the one or more first event identifiers, wherein the data corresponding to the one or more first event identifiers are received responsive to transmitting the real-time request message.

\* \* \* \* \*